United States Patent
Sukumaran et al.

(10) Patent No.: US 8,874,732 B1
(45) Date of Patent: Oct. 28, 2014

(54) SYSTEM AND METHOD FOR END-TO-END NETWORK-BASED SERVICES USAGE METERING VALIDATION

(75) Inventors: Anish Sukumaran, Chantilly, VA (US); Mahmoud A. Abuelela, Herndon, VA (US); Kevin Christopher Miller, Herndon, VA (US)

(73) Assignee: Amazon Technologies, Inc., Reno, NV (US)

( * ) Notice: Subject to any disclaimer, the term of this patent is extended or adjusted under 35 U.S.C. 154(b) by 292 days.

(21) Appl. No.: 13/314,990

(22) Filed: Dec. 8, 2011

(51) Int. Cl.
*G06F 15/173* (2006.01)

(52) U.S. Cl.
USPC .......................... 709/224; 709/200; 709/223

(58) Field of Classification Search
USPC ......................... 709/200, 223–224
See application file for complete search history.

(56) References Cited

U.S. PATENT DOCUMENTS

| 6,086,618 | A  | * | 7/2000  | Al-Hilali et al. ............... 703/2 |
| 7,769,651 | B2 | * | 8/2010  | Fine et al. ...................... 705/35 |
| 2003/0023712 | A1 | * | 1/2003 | Zhao et al. .................... 709/223 |
| 2005/0044191 | A1 | * | 2/2005 | Kamada et al. ............... 709/223 |
| 2005/0108379 | A1 | * | 5/2005 | Gray et al. .................... 709/223 |
| 2006/0236303 | A1 | * | 10/2006 | Wilson et al. ................. 717/104 |
| 2007/0078950 | A1 | * | 4/2007 | Hopkins et al. ............... 709/217 |
| 2007/0233448 | A1 | * | 10/2007 | Papaefstathiou et al. ....... 703/15 |
| 2008/0159506 | A1 | * | 7/2008 | Raheja ...................... 379/201.12 |
| 2008/0270526 | A1 | * | 10/2008 | Barnett et al. ................ 709/203 |
| 2010/0082504 | A1 | * | 4/2010 | Plat et al. ...................... 705/400 |
| 2012/0131161 | A1 | * | 5/2012 | Ferris et al. .................... 709/223 |
| 2012/0131174 | A1 | * | 5/2012 | Ferris et al. .................... 709/224 |
| 2012/0259993 | A1 | * | 10/2012 | Eidelman et al. ............. 709/230 |
| 2013/0036221 | A1 | * | 2/2013 | Pishevar et al. .............. 709/224 |
| 2013/0297242 | A1 | * | 11/2013 | Bartmess et al. .............. 702/61 |

* cited by examiner

*Primary Examiner* — Anthony Mejia
(74) *Attorney, Agent, or Firm* — Robert C. Kowert; Meyertons, Hood, Kivlin, Kowert & Goetzel, P.C.

(57) ABSTRACT

Systems and methods for end-to-end network-based services metering validation in a network-based services system may support configuring a client usage simulator on one or more computers to simulate client usage of a network-based services system. The system and method may include implementing an external usage meter in the client usage simulator to monitor and record one or more types of usage and send the information to an auditor implemented on one or more computers. An internal meter in the network-based services system may monitor and record usage of the network-based services system by the client usage simulator. The recorded information may be sent to an auditor for comparison with the external records.

22 Claims, 6 Drawing Sheets

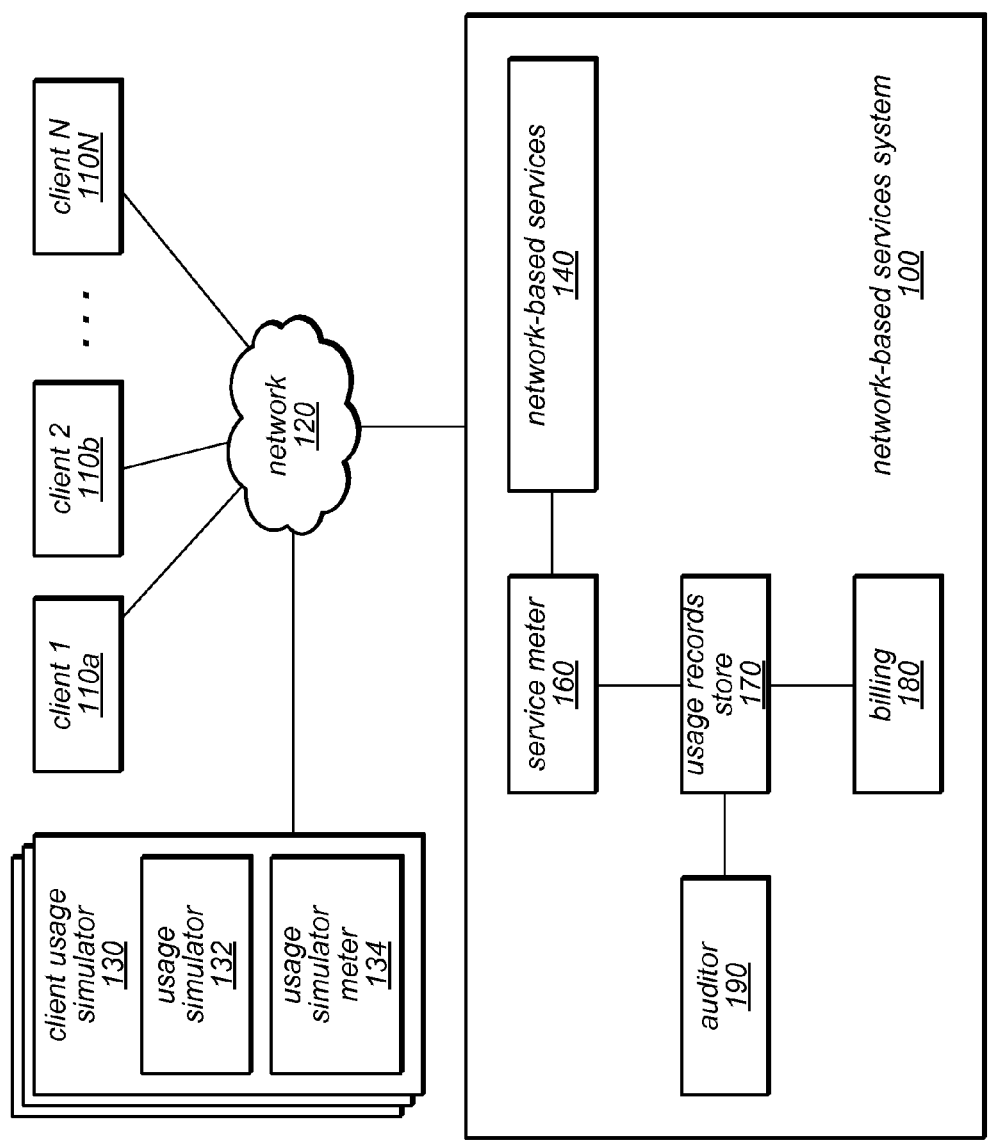

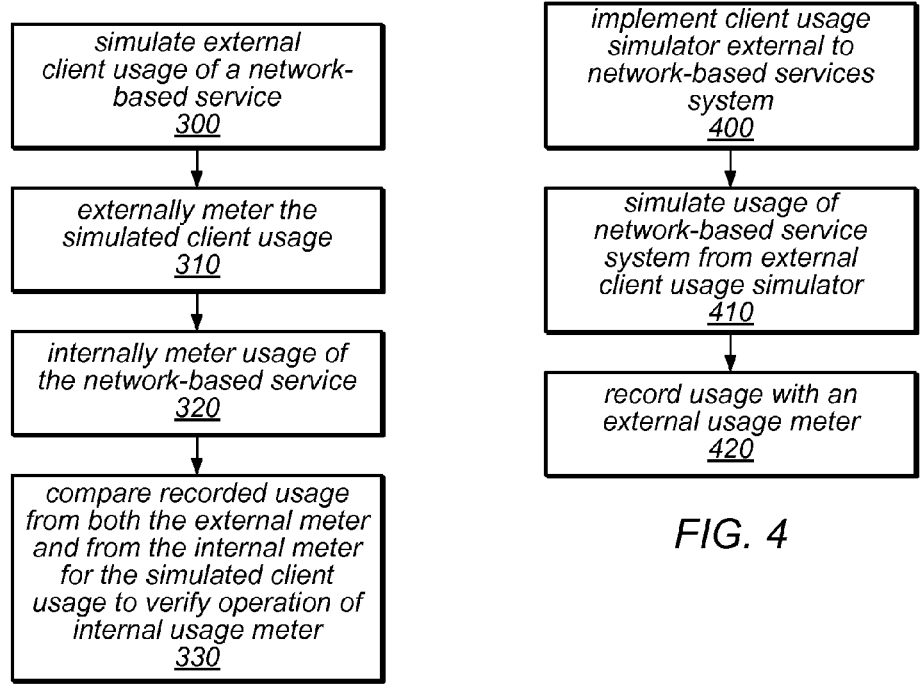
FIG. 3
FIG. 4
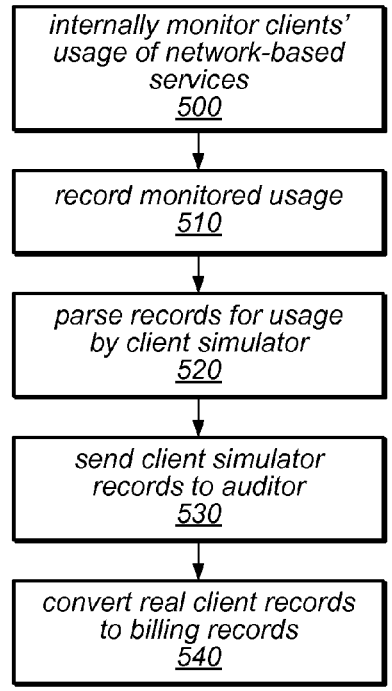
FIG. 5

SYSTEM AND METHOD FOR END-TO-END NETWORK-BASED SERVICES USAGE METERING VALIDATION

BACKGROUND

Network-based services systems have become widely available in recent years. Network-based services systems are typically geographically and logically separate from the client subscribing to the network-based service. Network-based services may be storage resources (e.g., virtual disk drives, RAID) and/or virtual compute resources (e.g., cloud storage and/or computing), for example. The resources in various configurations may be used, for example, by businesses (e.g., on-line retail, web based hosting services, financial services) for backup data storage, records storage, to store product images, process customer requests, and/or other computing tasks. In network-based service systems, the client may be charged for a certain usage of services of the network-based services system. The charges may be based on various metrics, such as, the amount of data transmitted, the amount of compute resources used, and/or the amount of storage used. To determine the usage information, hardware and software based measurement tools may be used within the network-based services system. These tools may measure the types of usage discussed above and store that data in a format that allows for billing based on the data.

As an example, a network-based services system may be configured as a storage service to provide storage for backup data or web hosting services. The data may be stored in client specific partitions. Charges for the storage service may be by the amount of data stored (e.g., per MByte or per GByte). Additional charges may incur based on the number of gets/puts for each data item transferred between the client and the network-based storage service. A get may be defined as a retrieval of data from a client bucket and a put may be defined as a store of data to a client bucket. As another example, a network-based services system may provide clients a network tunneling technology (e.g., VPN, IPSec) to ensure security of the data transmissions. The network-based services may also charge the client for the VPN connection time. To determine client usage charges, a service meter may be implemented internal to the network-based services system to measure and record the client usage.

However, in the case of system instability, internal metering records may become corrupted leading to incorrect billing statements being sent to customers. For example, an internal network interruption or service meter process failure may lead to incorrect or corrupt metering records. This may result in billing errors for a client (e.g., subscriber) to the network-based services system. As a result of such errors, the network-based services provider may under bill a client resulting in lost revenue, and/or over bill a client potentially resulting in a loss of goodwill.

BRIEF DESCRIPTION OF THE DRAWINGS

FIGS. 1A and 1B illustrate a block diagram of a network-based services system that supports end-to-end network-based services metering validation, according to one embodiment.

FIG. 3 is a flow diagram illustrating a method for simulating and monitoring an external client, according to one embodiment.

FIG. 4 is a flow diagram illustrating a method for implementing a client usage simulator, according to one embodiment.

FIG. 5 is a flow diagram illustrating a method for internally monitoring a client usage, according to one embodiment.

Figure 1B:
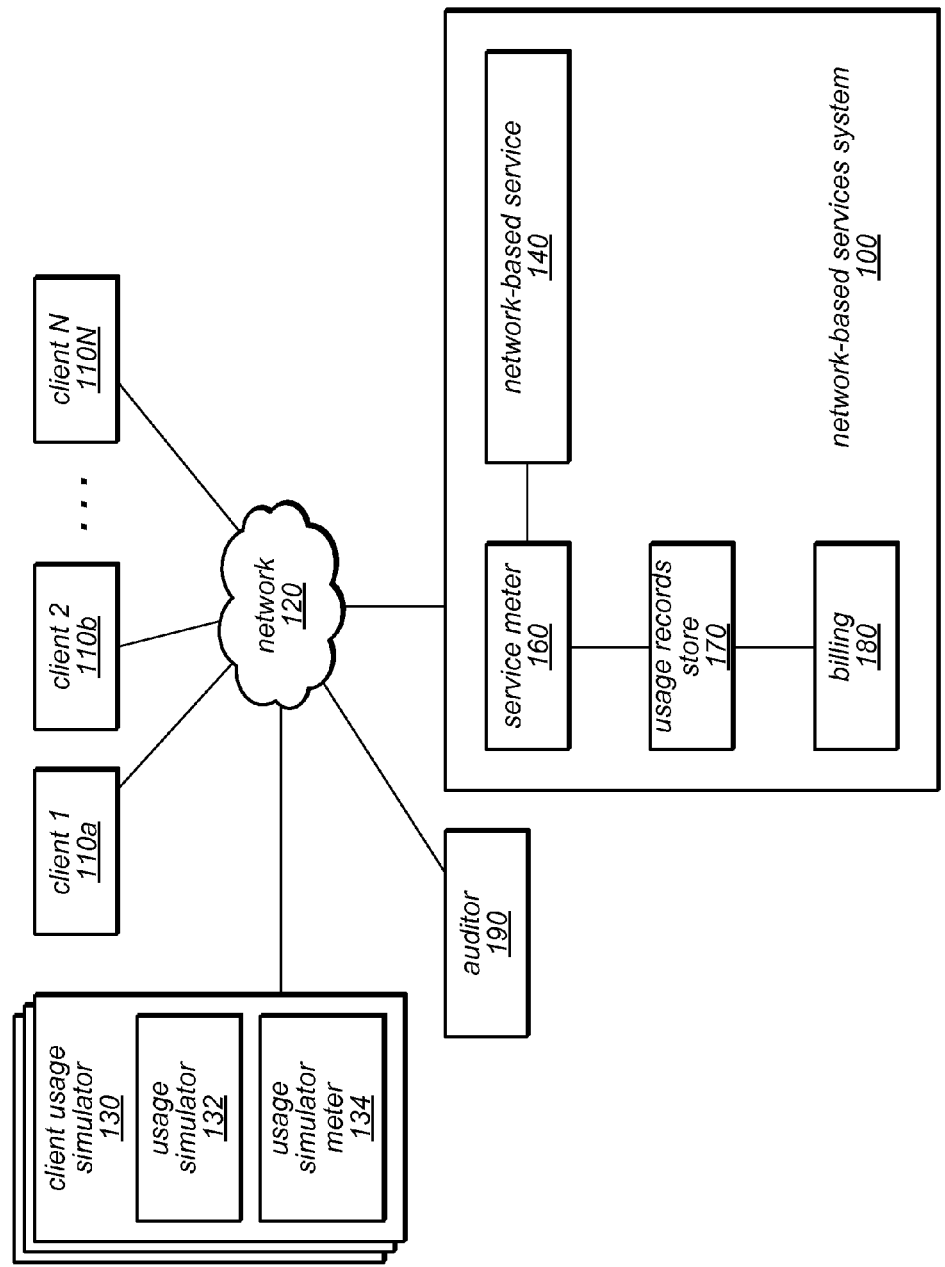

While the technology described herein is susceptible to various modifications and alternative forms, specific embodiments thereof are shown by way of example in the drawings and will herein be described in detail. It should be understood, however, that the drawings and detailed description thereto are not intended to limit the disclosure to the particular form disclosed, but on the contrary, the intention is to cover all modifications, equivalents and alternatives falling within the spirit and scope of the present disclosure as defined by the appended claims.

DETAILED DESCRIPTION OF EMBODIMENTS

Systems and methods are described herein for providing validation of end-to-end usage metering in a network-based services system. For example, the network-based services system may include one or more computers configured to provide one or more services, such as virtual compute or storage services, to one or more clients. One or more client usage simulators may be implemented by one or more computers external to a network of the network-based service. A client usage simulator may be configured to simulate one or more clients utilizing the network-based service and record information reflecting usage of the network-based service. A service meter internal to the network of the network-based service may be configured to monitor and record client usage of the network-based service (including the simulated usage). An auditor component may be implemented on one or more computers and configured to process and compare the information recorded by the external client usage simulator to information recorded by the service meter internal to the network-based system. The auditor may be further configured to indicate whether a discrepancy is present in the results of the comparison.

For example, in some embodiments, a network-based service may be configured to store data for a client, such as for backup purposes, web hosting or image hosting. As an example of usage, a client may transmit various amounts of data to or from the network-based services system during a given time period. The service meter internal to the network-based service may record the time period and amount of data from the client's transmissions. A billing component may convert the measured usage into a billing record. In some embodiments, the record of the client usage may also be saved as a historical record that may be utilized to analyze discrepancies in the metering/billing data. During the same period of time, the client usage simulator implemented external to the network-based service system may simulate client usage of the network-based services system by transmitting data to or from the network-based services system and recording the amount of data transmitted. The service meter internal to the network-based services system may also monitor and record the usage by the external client usage simulator since usage by the external client usage simulator appears as regular client usage to the internal service meter. An auditor may normalize and compare the information recorded at the client usage simulator and the information recorded by the service meter internal to the network-based services system. If the results of the comparison exceed a predetermined threshold, the records may be flagged for further analysis. Historical records provided by client information gathered over time may be analyzed to determine if their usage pattern indicate a possible source of the discrepancy.

FIGS. 1A and 1B illustrate block diagrams of network-based systems that support end-to-end network-based services metering validation. Generally speaking network-based services system 100 provides services to one or more clients 110. For example, network-based services 140 may provide remote virtual storage resources. Another example of a network-based service 140 may be a configuration of one or more virtual machines and/or storage resources (e.g., cloud computing) in network-based services system 100. Clients 110 of these types of services may include, for example, web-based services that host and/or share videos, photos etc., businesses who require backup storage, and/or an online retail business.

The network-based services system 100 may implement one or more internal service meters 160 to monitor various types of client usage (e.g., bandwidth usage, the number of accesses to storage, VPN connection time, etc.) of network-based services 140 in the network-based services system 100. The record of client usage may be converted to billing records for each client of the network-based services. To validate the systems and methods that create the billing, an end-to-end record auditor 190 may be implemented. One or more client usage simulators 130 may be remotely implemented to simulate a client using the network-based services 140 of the network-based services system 100. The simulated usage may be monitored externally to the network-based services system by a usage simulator meter and the information externally recorded. In other embodiments, one or more client usage simulators 130 may be located within network-based services system 100 and send simulated client usage outside network-based services system 100 to be routed back in to network-based services system 100. The service meter 160 internal to the network-based services system 100 internally monitors and records the simulated usage of the network-based services just like any other client usage. The auditor 190 may compare the record from the external client usage simulator 130 to the record from the internal service meter 160 internal to the network-based services system to check for discrepancies between the external and internal record for the simulated client usage. Prior to comparing the records at auditor 190, the records may be normalized to account for synchronization or data capture differences between records from external client usage similar 130 and internal service meter 160. The auditor may determine whether or not the externally recorded simulated usage matched the internal recorded usage within a predetermined threshold. The threshold may be predetermined in some embodiments according to an acceptable expected difference. Different thresholds may be used for different network-based services and/or different types of usage. If the threshold is exceeded, then the discrepancy may be indicative of a problem in network-based services system's internal usage meter and records systems. Historical usage patterns of client records (e.g., subscriber records) in the network-based services system may be examined to assist in determining a source of the discrepancy. The components are described in further detail below.

Network-based services system 100 may couple to clients 110 via network 120. Clients 110 may be, for example, systems for a business enterprise, an educational entity, a government entity, a private entity, or in general any entity coupled to network-based services system via a network 120 (e.g., Internet). In addition, network-based services system 100 and client 110 may be located in different geographic locations and logically isolated from one another, in some embodiments.

Network-based services 140 may be configured to provide services to one or more clients. As discussed above, network-based services 140 may be configured, for example, as a virtual storage resources, virtual compute resources (e.g. cloud storage or computing), or any other service offered via a network interface (e.g., web services interface). For example, clients 110 may use a storage resource provided by service 140 as storage for backup and/or for a web-based business (e.g., retail service, photo hosting service, etc.).

Service meter 160 may be configured to monitor usage of the network-based services. The service meter may be implemented in software and/or hardware. In addition, service meter 160 may be configured to monitor one or more types of usage (e.g., bandwidth usage, connection time, etc.) at network-based services system 100. Service meter 160 may record client usage information in usage records store 170. A billing generator 180 may access records in usage records store 170 to determine billing for each client. As an example, billing may include charges for the amount of remote storage resources used and/or how long each resource was utilized by a client of the network-based services system.

In some embodiments, client usage simulator 130 may be implemented external to network-based services system 100. In alternate embodiments, client usage simulator 130 may be implemented in network-based services system 100 and transmit simulated client usage external to network-based services system 100 to be routed back in to network-based services system 100 to simulate external client usage. Client usage simulator 130 may be implemented with usage simulator 132 and usage simulator meter 134. Client usage simulator 130 may be configured with hardware and/or software similar to a client of network-based services systems. Usage simulator 132 may simulate client usage of network-based services 140 in network-based services system 100. Usage simulator may simulate usage by, for example, periodically creating one or more connections to network-based services 140 and/or sending or receiving data. For example, usage simulator 132 may transmit a certain amount of data each day to simulate a client storing data in a network-based service configured as storage. Usage simulator meter 134 may record the output of usage simulator 132. As an example, usage simulator 132 may transmit 40 GBytes of data to network-based services system 140 via network 120 and usage simulator meter 134 may record that 40 GBytes of data were transmitted. In addition, when network-based services 140 in network-based services system 120 receives the 40 GBytes of data, service meter 160 may record the transmission in usage records store 170.

Auditor 190 may be implemented in network-based services system 100. Auditor 190 may be configured to receive usage simulator meter records 134. In addition, auditor 190 may be configured to parse the client usage simulator records from records store 170. Furthermore, auditor 190 may be configured to normalize the internal and external records to compensate, e.g., for measurements in a non-synchronized system. Client usage simulator 130 may have a client identifier similar to identifiers associated with any other client 110. Auditor 190 may query usage records store 170 for records associated with the client identifier for client usage simulator 130 for a given time period to be audited. Auditor 190 may be configured to receive records of the client simulator usage from external usage simulator meter 134 records. For example, usage simulator meter 134 may send usage records to auditor 190 via an interface provided by network-based services system 100. In other embodiments, auditor 190 may request the records from client usage simulator 130. Auditor 190 may be further configured to normalize and compare information from the same period of time in these two records to determine if the results validate the operation of service meter 160 and usage records store 170. In some embodiments, due to differences in the time bases within the system, for example, the usage records may be normalized to ensure comparisons between records are accurate. Auditor 190 may normalize the internal and external usage records to the same time period. In other embodiments, auditor 190 may normalize the internal and external usage records a common unit of measurement or data capture methodology. Auditor 190 may check for any discrepancies between the internal records from usage records store 170 for client usage simulator 130 and the external records of the same usage from usage simulator meter 134. In some embodiments, some variation in the normalized records may be expected, for example, due to differences in latencies at external usage simulator meter 134 and internal service meter 160. Therefore, in some embodiments, auditor 190 may only declare a discrepancy if the normalized usage records from usage simulator meter 134 fail to match the internal normalized usage records from usage record store 170 by a threshold. The threshold may be predetermined in some embodiments according to an acceptable expected difference. Different thresholds may be used for different services and/or different types of usage. If auditor 190 determines a discrepancy (e.g., the results exceed a predetermined threshold), auditor 190 may use historical patterns of usage found in one or more client records to assist in finding a source of the discrepancy. For example, if client usage patterns indicate a change in the average usage or expected usage for a certain type of usage this may indicate a problem with the internal metering. If the client usage patterns are as expected, then the discrepancy may be due to an issue in the external client usage simulator and/or external metering. This will be described in further detail in the FIGs. below.

In an alternate embodiment, as shown in FIG. 1B, auditor 190 may be implemented external to network-based services system 100. In the embodiments shown in FIG. 1B, auditor 190 may be implemented, for example, by a third party to independently audit usage record 170 and usage simulator meter 134 records. For example, network-based services system 100 may be configured as a virtual compute resource. Clients may configure a networking tunneling technology (e.g., VPN, IPSec) to connect to network based services system 100 via a network 120 (e.g., Internet). The network-based services may charge the client for the amount of time the VPN connection is active. Service meter 160 internal to the network based services system 100 may monitor the usage, store the usage information in usage record 170 and convert the information to billing generator 180 for each client. To independently validate the measurements of VPN usage, a client usage simulator may be implemented external to the network-based services system. The client usage simulator may create a VPN connection for a certain amount of time to simulate client usage. The external meter (e.g., usage simulator meter 134) may measure the VPN usage and send the records to auditor 190. The internal meter (e.g., service meter 160) may measure the VPN usage in network-based services system 100 and send the recorded information (e.g., usage records store 170) to auditor 190. Auditor 190 may normalize and compare the VPN usage time from the two records and determine there is a discrepancy within a predetermined threshold.

Figure 2:
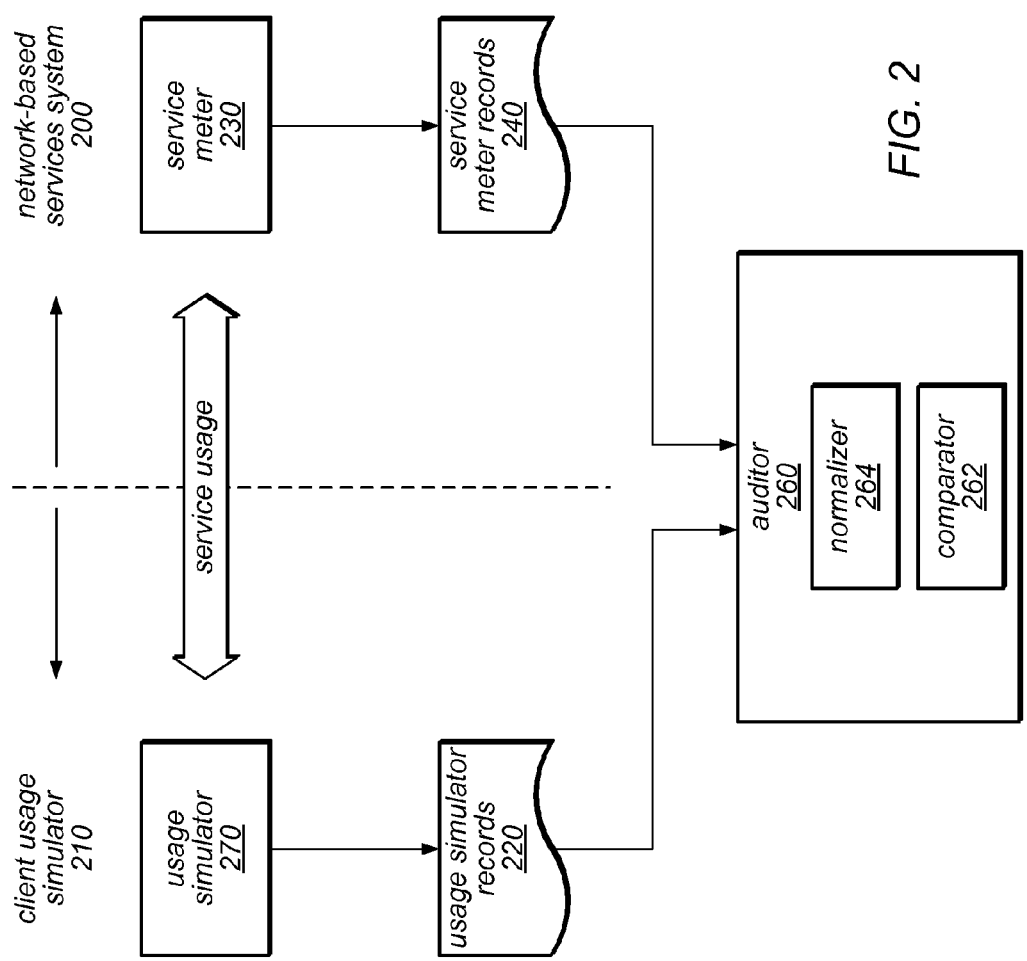
FIG. 2 illustrates a diagram illustrating the flow of information in a network-based services system with end-to-end network-based services metering validation, according to one embodiment.

FIG. 2 illustrates a diagram illustrating the flow of information for a network-based services system with end-to-end usage metering validation according to one embodiment. In general, a client usage simulator 210 may be implemented to couple to a network-based services system 200. The client usage simulator 210 may, for example, periodically send and/or receive data external to the network-based services system 200 to simulate usage of network-based services. The simulated usage may be recorded by a component external to the network-based services system. Usage of the network-based services system, may also be monitored by a service meter 230 internal to the network-based services system. An auditor 260 may receive the recorded usage information, normalize the recorded usage information, and may compare the records of the internal and external monitored usage. Discrepancies in the comparison may indicate a need for further investigation. Each of the components described below may correspond to the respective components in FIGS. 1A & 1B.

Client usage simulator 210 may be configured to simulate client usage of a network-based service of a network-based services system. As discussed above, one or more client usage simulators 210 (e.g. client usage simulator 130 in FIG. 1) may be implemented such that it is independent of and/or externally transmits data to the network-based services system. The client usage simulator may couple to a network (e.g., Internet) via the same software (e.g., VPN connection via the same API as a client) and/or hardware (e.g., routers) as an actual client would. This ensures that the monitored usage gathered from client usage simulator 210 and recorded in usage simulator records 220 accurately reflect usage of network-based services system 200 at any given snapshot in time. As an example, to simulate usage, client usage simulator may create a VPN tunnel and continuously or periodically send and receive data to/from the network based services system The simulated usage of network-based services system 200 may be monitored by service meter 230 (e.g., usage simulator meter 134 in FIG. 1A). Service meter 230 may be configured to monitor one or more types of usage in one or more services of network-based services system 200. One example of the types of usage that may be measured is the amount of data transmitted (e.g., bandwidth usage). Another example is the number of accesses to a storage resource. This may be in the form of transmitting data (e.g., puts) and/or receiving data (e.g., gets). A further example is monitoring the amount of time a network tunneling connection (e.g., VPN, IPSec) is active. The network tunneling connection may provide for secure data transmission with network-based services system 200. Service meter 230 may record the usage information in service meter records 240.

Auditor 260 (e.g., auditor 190 in FIGS. 1A and 1B) may be configured to receive usage simulator records 220 and service meter records 240 (e.g., service meter 160 in FIGS. 1A and 1B). Since the simulated usage from client usage simulator 210 (e.g., client usage simulator 130 in FIGS. 1A and 1B) to network-based services system 200 simulates a path and/or choices that a client would use, the usage records of client 210 may be used to validate service meter 230 in network-based services system 200. In addition, auditor 260 may comprise normalizer 264 and comparator 262.

Normalizer 264 may be configured to analyze service meter records 240 and usage simulator records 220 to determine if the time frames match. For example, in a network-based services system (e.g., network-based services system 100 in FIGS. 1A and 1B) the components of the system may not be synchronized (e.g., operating from the same time base and/or clock), so normalizer 264 may determine the appropriate time frame to compare and adjust the records accordingly. As another example, usage simulator records 220 and service meter records 240 may have different time scales and normalizer 264 may need to adjust the data so that the units of comparison match. In other embodiments, usage simulator records 220 and service meter records 240 may have been recorded according to different data capture methodologies. Normalizer 264 may normalize one or both of the records so that the usage data reflects the same data capture methodology, such as the same units or measure of usage.

Comparator 262 in auditor 260 may compare each normalized usage simulator record 220 to normalized service meter records 240 from the same period of time to determine if there are any discrepancies. Auditor 260 may use a predetermined threshold to determine if the results of the comparison (e.g. in comparator 262) of usage simulator record 220 to service meter records 240 are valid. In some embodiments, auditor 260 may be internally implemented in network-based services system 200. In alternate embodiments, a third party may remotely implement auditor 260 to independently validate the monitoring of network-based services system 200.

For example, a client usage simulator 210 may be configured to use network-based services system 200 as a virtual storage device. The client usage simulator may request a 1 TeraByte storage resource and over the course of day may transmit 300 GBytes of data (e.g., a put) and receive 100 GByte of data (e.g., a get). The service meter may monitor the amount of data transmitted and the number of accesses (e.g., put/get) and record this information in a usage simulator record external to network-based services system. The service meter of the network-based services system may record the put of 300 GBytes of data and the get of 100 GByte of data. The auditor may normalize and/or compare the records of the service meter in the network-based services system to the record of the client usage simulator for a certain period of time. If the results of the comparison show no discrepancy, the service meter of the network-based services system may be operating correctly. If the results of the comparison indicate a discrepancy, then a problem may have occurred in the usage metering or records. This will be described in further detail in later FIGs.

FIG. 3 is a flow diagram illustrating a method for simulating and monitoring an external client, according to one embodiment. To validate the metering in the network-based services system (e.g., network-based services system 100 in FIGS. 1A and 1B), client usage may be simulated, monitored and recorded (e.g. client usage simulator 130 in FIGS. 1A and 1B). The client usage may be simulated with components implemented to externally transmit data to the network-based services system. In addition, the same simulation may be monitored and recorded by a service meter (e.g. service meter 160 in FIGS. 1A and 1B) in the network-based services system. The two usage recordings may be normalized and compared to determine if the results are within a predetermined threshold. If the results exceed the threshold, further investigation of the monitoring may be required. As discussed above, the threshold may be predetermined in some embodiments according to an acceptable expected difference. In addition, different thresholds may be used for different services and/or different types of usage. Details of the methods for simulating and monitoring an external client are described below.

As indicated in 300, client usage of network-based services may be simulated. Client usage may be simulated by periodically transmitting and/or receiving data to/from the network-based services (e.g., network-based services 140). In another embodiment, the client usage simulator may periodically execute a "get" (e.g., a data request) to network-based services to simulate a client.

The usage simulated (e.g. as performed by usage simulator 132 in FIGS. 1A and 1B), as described above, may be externally metered (e.g., as performed by usage simulator meter 134) as indicated in 310. One or more types of simulated usage may be externally monitored and recorded. To continue the example above, the types of usage that may be monitored may be the bandwidth used to transmit the data images to storage in the network-based services system and/or the number of accesses to storage to retrieve data from the network-based services system, or a number of connections created, connection up time, number of compute instances create, running time of a compute instance, number of jobs, etc.

As indicated in 320, the same types of the usage (e.g., metrics) may also be internally monitored and recorded in the network-based services system as the network-based services receive the data and/or requests. As discussed in 310, the types of usage monitored and recorded may be the bandwidth and/or the number of access during the same period of time. An internal service meter (e.g. service meter 160 in FIGS. 1A and 1B) may be implemented monitor both simulated client usage and client usage.

As indicated in 330, the external records from the client usage simulation may be compared to the internal records in the network-based services system. As discussed above, the records may be normalized prior to the comparison. This may validate that the metering in the network-based services system is operating correctly. For example, if the records match, that may indicate that the data simulated is correctly monitored and recorded internally and externally to the network-based services system. Since the same internal meters are used to meter all client usage, if the simulated usage is being correctly metered by the internal meter(s), then that gives confidence to the internally metering as a whole for all client usage. However, if there is a mismatch, then there may be an issue with the monitoring tools that requires further investigation. This will be explained in further detail in subsequent FIGs.

FIG. 4 is a flow diagram illustrating a method for implementing a client usage simulator (e.g., client usage simulator 130), according to one embodiment. Generally speaking, as discussed above, a client usage simulator may be implemented to independently validate service metering in a network-based services system (e.g., network-based services system 100 in FIGS. 1A and 1B). The client usage simulator may be configured with hardware (e.g., routers) and/or software (e.g., applications, data) that a client subscribing to a network-based services system would implement. A meter that is implemented (e.g. usage simulator meter 134 in FIGS. 1A and 1B) independently of a network-based services system may monitor and record the usage information from the client usage simulator (e.g., client usage simulator 130 in FIGS. 1A and 1B).

As indicated in 400, a client usage simulator (e.g., client usage simulator 130 in FIGS. 1A and 1B) may be implemented external to a network-based services system. As discussed above, the client usage simulator may be implemented with the hardware (e.g., routers) and/or software (e.g., applications, data) as a client would. The client usage simulator may configure its portion of the network-based services (e.g., network-based services 140 in FIGS. 1A and 1B) as a client would. For example, a network-based services system (e.g. network-based services system 100 in FIGS. 1A and 1B) may have a web-based interface that allows a client to interactively choose configuration options for their resources in the network-based services system.

As indicated in 410, the client usage simulator may simulate client usage. As described in FIG. 2, the client usage simulator may operate as a client would operate. For example, the data transmitted may include storing photos and/or images to simulate a client configured as a web-based photo hosting business. In addition as described above, the client usage simulator may be configured to simulate an on-line retail business that requires multiple accesses to a storage resource that may include web page information. In alternate embodiments, the client usage simulator may have a predetermined set of data (e.g., various file sizes) with a random bit pattern and/or a fixed set of data that is reused to simulate client usage.

As indicated in 420, simulated client usage may be recorded external to network-based services system (e.g., network-based services system 100 in FIGS. 1A and 1B). Examples of usage parameters that may be recorded are VPN connection time, bandwidth usage and/or number of transactions (e.g., puts/gets).

For example, a client usage simulator may be configured to use the network-based services as storage resource. The client usage simulator may be coupled to the network-based simulator via a networking tunneling technology (e.g., VPN). The client usage simulator may maintain the VPN connection for an hour. During that hour the client usage simulator may store 40 GBytes of data every 10 minutes in the networked based service configured as a storage resource. The external usage meter may monitor the client usage simulator and record 1 hour of VPN connection, 7 puts to storage and certain amount of bandwidth usage (e.g., 1 GBits/sec) which may be dependent on the network capabilities. The record generated by the external usage meter may be compared to monitored information from the service meter internal to network-based services system as described in FIG. 3. In addition, as discussed above in FIG. 3, the records may be normalized prior to comparison.

FIG. 5 is a flow diagram illustrating a method for internally monitoring client usage that may be performed in a network based services system (e.g. network-based services system 100 in FIGS. 1A and 1B), according to one embodiment. In general, network-based services may have one or more clients (e.g., clients 110 in FIGS. 1A and 1B) subscribed to the services offered by the network-based services system. Each service has specific metrics or types of usage that determine the billing rate for the services. To determine each client bill, client usage may be monitored by a service meter (e.g., service meter 160 in FIGS. 1A and 1B) in the network-based services. The client records may be parsed and converted to billing records. In addition, the client records may be parsed to determine usage of a client usage simulator. A comparison of the records may be performed by and auditor (e.g. auditor 190 in FIGS. 1A and 1B) as described in FIG. 4).

As indicated in 500, client usage of network-based services may be monitored internally to a network-based services system. Monitoring the one or more metrics or types of usage may be performed by a monitor (e.g., service meter 160 in FIGS. 1A and 1B) implemented internal to the network-based services system. As discussed above, the metrics may include, but are not limited to, VPN connection time, bandwidth usage and/or the number of transactions.

As indicated in 510, the monitored usage may be recorded internally in the network-based services system. As indicated in 520, the usage records may be parsed to locate the client usage simulator records. The parsed records may be sent to the auditor as indicated in 530. The auditor may be implemented internal to the network-based services system or in other embodiments external to the network-based services system. The auditor may further process the records as described in the following FIG. In addition, the real client records may be sent to billing (e.g., billing generator 180 (e.g., service meter 160 in FIGS. 1A and 1B) and converted to billing records as indicated in 540.

As described in the example provided in FIG. 4, the client usage simulator may maintain the VPN connection for an hour. During that hour the client usage simulator may store 40 GBytes of data every 10 minutes in the network-based services configured as a storage resource. The external usage meter may monitor the client usage simulator and record 1 hour of VPN connection, 7 puts to storage and a certain amount of bandwidth usage dependent on the network. To continue the example, the data sent by client usage simulator is received by the network-based services in the network-based services system and monitored by a service meter internal to the network-based services system. The internally monitored data may be recorded. In this example the internally recorded information may be 1 hour of VPN connection, 7 puts to storage the bandwidth usage as simulated by the client usage simulator. The recorded information may then be sent to the auditor for further processing. If the recorded information were from an actual client (e.g., subscriber to the network-based services) the recorded information would be converted to billing records.

Figure 6:
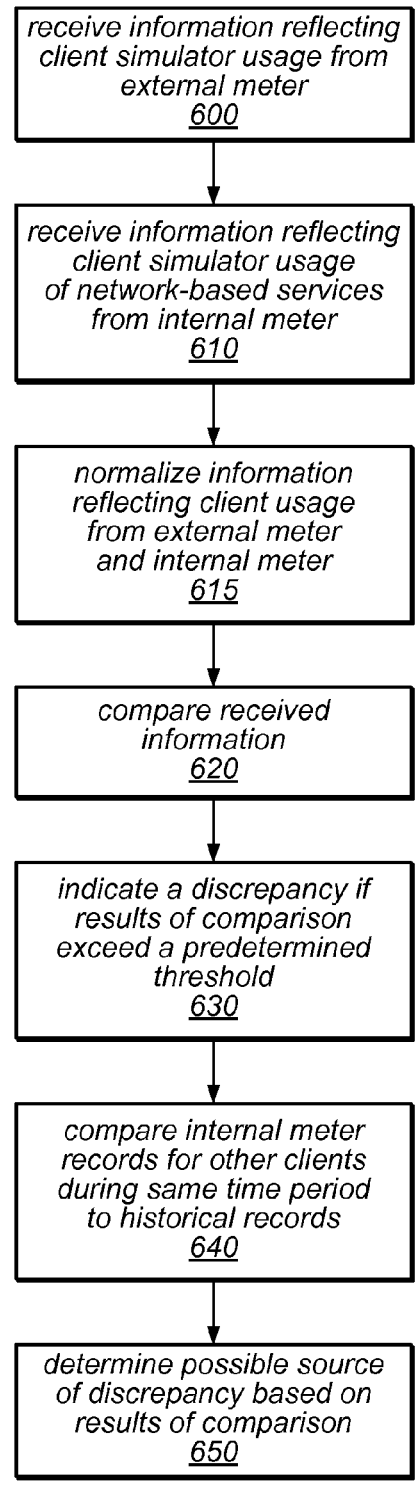
FIG. 6 is a flow diagram illustrating a method for auditing client usage simulator records, according to one embodiment.

FIG. 6 is a flow diagram illustrating a method for auditing client usage simulator records, according to one embodiment. In general an auditor may be implemented in the network-based services system to validate the service meter used to monitor and record client usage of network-based services. The auditor may receive usage information from internally monitored sources (e.g., the service meter 160 in FIG. 1A or 1B) and receive usage information from an external client usage simulator implemented in the FIGs. described above. These records may be normalized and compared to validate the meter internal to the network-based services system (e.g., network-based services system 100 in FIGS. 1A and 1B). If there is a discrepancy, historical client records may be analyzed to determine the usage pattern indicates a possible source of the discrepancy indicated by the results of comparison.

As indicated in 600, information may be received from an external meter (e.g., usage simulator meter 134 in FIGS. 1A and 1B) reflecting client simulator usage of the network-based services (e.g., network-based services 140 in FIGS. 1A and 1B). In addition, the information may reflect client simulator usage of network-based services as measured from the internal meter (e.g., service meter 160 in FIGS. 1A and 1B) as indicated in 610.

As indicated in 615, the information reflecting client simulator usage from the external meter (e.g., usage simulator meter 134 in FIGS. 1A and 1B) and internal meter (e.g., service meter 160 in FIGS. 1A and 1B) may be normalized. Data from the two sources may be normalized to ensure a valid comparison. In some embodiments, to normalize the records from the internal and external meters, the beginning and end of the record may be examined. The data immediately preceding the beginning of the data in the record may be examined to determine if adding the data to the record resolves any mismatches. The data immediately after the end of the data in the record may be examined to determine if adding the data to the record resolves any mismatches. In addition, previous assumptions about the data may be used to determine the normalization. For example, it may be determined that historically the 10 minutes of recorded data prior to the record of the metered data from the client usage simulator under consideration is needed to ensure realistic results are obtained when comparing internal and external metering of client usage simulation.

For example, if a network-based system is not synchronized (e.g., different clocks and/or time bases), then records with the metered data may need to be normalized (e.g., normalizer 264 in FIG. 2) as described above to ensure that the time frame matches prior to comparison. As another example, when monitoring the transmitted data, the client usage simulator (e.g. client usage simulator 130 in FIGS. 1A and 1B) may monitor (e.g., usage simulator meter 134 in FIGS. 1A and 1B) both the payload and the metadata of the transmitted data. The internal meter (e.g. service meter 160 in FIGS. 1A and 1B) may monitor only the payload of the transmitted data from the client usage simulator. In this example, the records from metering the client usage simulator and the records from internally metering the data would be normalized (e.g., normalizer 264 in FIG. 2) to only compare the payload in order for the results to be valid.

As indicated in step 620, the external and internal records of the client usage simulation may be compared. The comparison may be performed by a comparator component (e.g., comparator 262 in FIG. 2) in an auditor (e.g. auditor 260 in FIG. 2). In addition, the records from the internal and external metering are from the same period of time so that internal metering may be validated by determining that the information sent from the client usage simulator (e.g., client usage simulator 130 in FIGS. 1A and 1B) matches the client usage information monitored at the network-based services. As discussed above, the records may be normalized prior to the comparison.

As a result of the comparison a discrepancy may be indicated. In some embodiments, as indicated in 630, the auditor may indicate a discrepancy if results of the comparison in 620 exceeds a predetermined threshold. As discussed above, the threshold may be predetermined in some embodiments according to an acceptable expected difference. Different thresholds may be used for different services and/or different types of usage. If the threshold is exceeded, the historical client records may be examined to analyze patterns as indicated in 640. The historical usage patterns from the one or more client records (e.g., client records from subscribers or clients to the network-based services) may indicate that the source of the discrepancy may be internal to the network-based system as indicated in 650. If the client historical patterns do not indicate any changes to average or expected usage for a certain type of usage monitored, then the source of the discrepancy may be external to the network-based services system.

For example, assume the client usage simulator simulated transmission of 10 TBytes of data to the network-based services system over a month. The external meter recorded transmission of 10 TBytes of data to the network-based services system over the month. However, the internal meter recorded that 10.5 TBytes of data were received by the network-based services during the same time period. When the auditor compares the two records, it may indicate that there is a discrepancy of 0.5 TByte of data. The auditor may review the historical usage patterns of 75 clients. If the usage patterns of the clients indicate that on average over the course of a year, clients transmitted 9 TBytes of data per month to the network-based services system, but during the time period under investigation, the average increased from 9 TBytes per month to 9.5 TBytes per month. This 0.5 TByte increase in the client historical average from the same time period may indicate that the discrepancy in the measured usage is internal to the network-based services system.

It is contemplated that in some embodiments, any of the methods, techniques or components described herein may be implemented as instructions and data capable of being stored or conveyed via a computer-accessible medium. Such methods or techniques may include, for example and without limitation, various methods of monitoring client usage of a network-based services system and/or creating a simulated client usage as described herein. Such instructions may be executed to perform specific computational functions tailored to specific purposes (e.g., monitoring usage of a network-based services system; logging data corresponding to the monitored resources; storing, retrieving, modifying, deleting, and/or otherwise accessing data; configuring storage and/or virtual machines, etc.) as well as higher-order functions such as operating system functionality, virtualization functionality, network communications functionality, application functionality, storage system functionality, and/or any other suitable functions.

Figure 7:
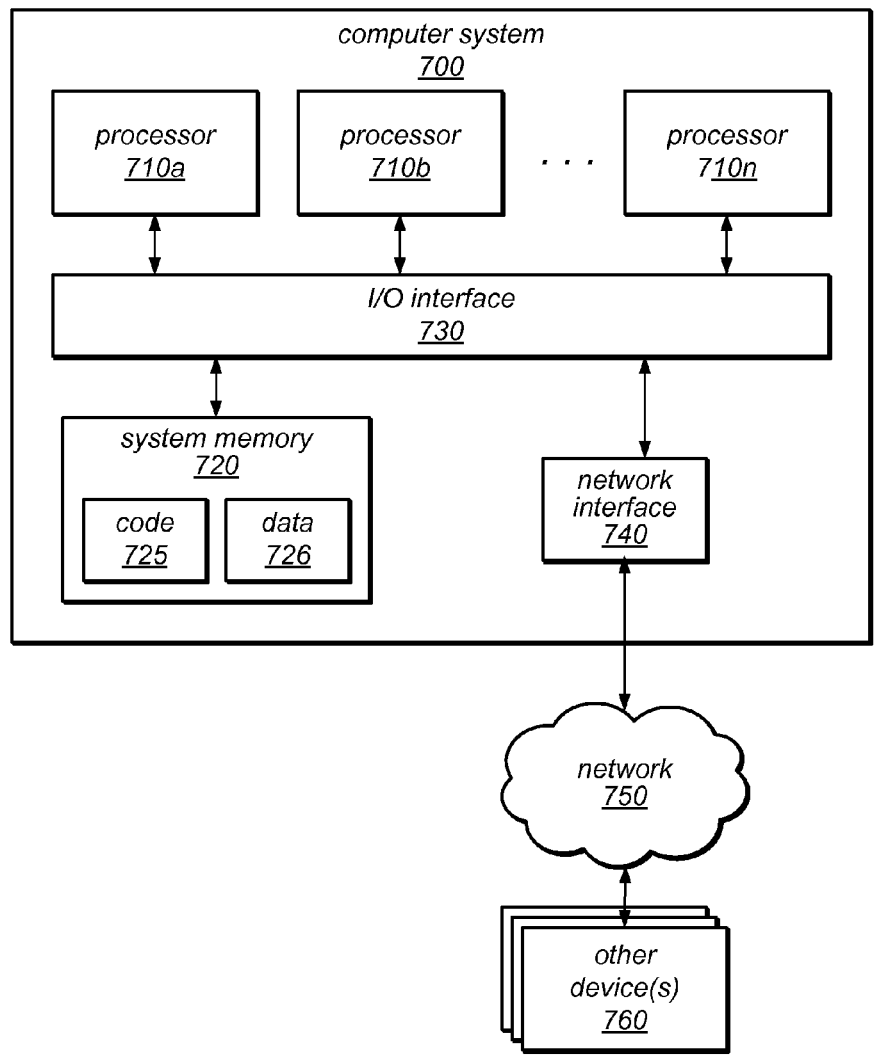
FIG. 7 illustrates a block diagram of one embodiment of a computer system that supports end-to-end network-based services metering validation, according to one or more embodiments as described herein.

One example embodiment of a computer system that includes computer-accessible media and that supports end-to-end network-based services metering validation, as described herein, is illustrated in FIG. 7. In various embodiments, the functionality of any of the various modules or methods described herein may be implemented by one or several instances of computer system 700. For example, multiple computing nodes may implement network-based service system that supports multiple clients, any or all of which may comprise instances of computer 700. In particular, it is noted that different elements of the system described herein may be implemented by different computer systems 700. For example, a network-based services system that provides the functionality described herein may be implemented on multiple computer systems 700 in geographically different locations.

In the illustrated embodiment, computer system 700 includes one or more processors 710 coupled to a system memory 720 via an input/output (I/O) interface 730. Computer system 700 further includes a network interface 740 coupled to I/O interface 730. In various embodiments, computer system 700 may be a uni-processor system including one processor 710, or a multiprocessor system including several processors 710 (e.g., two, four, eight, or another suitable number). Processors 710 may be any suitable processor capable of executing instructions. For example, in various embodiments processors 710 may be a general-purpose or embedded processor implementing any of a variety of instruction set architectures (ISAs), such as the x86, PowerPC™, SPARC™, or MIPS™ ISAs, or any other suitable ISA. In multiprocessor systems, each of processors 710 may commonly, but not necessarily, implement the same ISA.

System memory 720 may be configured to store instructions (e.g., code 725) and data (e.g., in data store 722) accessible by processor 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, instructions and data implementing desired functions, methods or techniques (such as functionality for logging metrics, for performing various operations to store, retrieve, modify, delete, and/or for auditing logs), are shown stored within system memory 720 as code 725. It is noted that in some embodiments, code 725 may include instructions and data implementing desired functions that are not directly executable by processor 710 but are represented or encoded in an abstract form that is translatable to instructions that are directly executable by processor 710. For example, code 725 may include instructions specified in an ISA that may be emulated by processor 710, or by other code 725 executable on processor 710. Alternatively, code 725 may include instructions, procedures or statements implemented in an abstract programming language that may be compiled or interpreted in the course of execution. As non-limiting examples, code 725 may include code specified in a procedural or object-oriented programming language such as C or C++, a scripting language such as Perl, a markup language such as HTML or XML, or any other suitable language. In some embodiments, data (e.g., logs, billing records) may be stored in a data store 722 within system memory 720.

In one embodiment, I/O interface 730 may be configured to coordinate I/O traffic between processor 710, system memory 720, and any peripheral devices in the device, including network interface 740 or other peripheral interfaces. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 720, may be incorporated directly into processor 710.

Network interface 740 may be configured to allow data to be exchanged between computer system 700 and other devices attached to a network (not shown), such as other computer systems, for example. In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

In some embodiments, system memory 720 may include a non-transitory, computer-accessible storage medium configured to store instructions and data as described above. However, in other embodiments, instructions and/or data may be received, sent or stored upon different types of computer-accessible storage media. Generally speaking, a computer-accessible storage medium may include storage media or memory media such as magnetic or optical media, e.g., disk or CD/DVD-ROM coupled to computer system 700 via I/O interface 730. A computer-accessible storage medium may also include any volatile or non-volatile storage media such as RAM (e.g. SDRAM, DDR SDRAM, RDRAM, SRAM, etc.), ROM, etc, that may be included in some embodiments of computer system 700 as system memory 720 or another type of memory. A computer-accessible storage medium may generally be accessible via transmission media or signals such as electrical, electromagnetic, or digital signals, conveyed via a communication medium such as a network and/or a wireless link that may be implemented via network interface 740.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
    a network-based service implemented by one or more computers, wherein the network-based service is configured to provide one or more services to clients;
    a client usage simulator implemented on one or more computers external to a network of the network-based service, wherein the client usage simulator is configured to:
        simulate one or more clients utilizing the network-based service; and
        record information reflecting usage of the network-based service from the client usage simulator;
    a service meter internal to the network of the network-based service configured to monitor client usage of the network-based service,
        wherein the service meter is further configured to record information reflecting the usage;
    an auditor component implemented on one or more computers and configured to:
        compare the usage information recorded by said client usage simulator to the usage information recorded by said service meter for the client usage simulator; and
        indicate a discrepancy from comparing the usage information recorded by said client usage simulator to the usage information recorded by said service meter for the client usage simulator.

2. The system of claim 1, wherein the auditor component is further configured to indicate said discrepancy in response to a result of said compare being outside a predetermined threshold.

3. The system of claim 1, wherein to monitor client usage of the network-based service further comprises to measure by said service meter at least one of a bandwidth usage, virtual private network (VPN) usage, number of transactions, connection time, compute resource usage, or storage resource usage.

4. The system of claim 1, wherein the system further comprises a billing component configured to convert said recorded information from said service meter to billing records.

5. A system, comprising:
    one or more computers implementing a client usage simulator, wherein the client usage simulator is configured to:
        simulate client usage, wherein simulating client usage comprises simulating one or more external clients utilizing a network-based service in the network-based services system; and
        send to an auditor information reflecting usage of the network-based service from the client usage simulation; and
    one or more computers implementing a service meter as part of the network-based service system, wherein the service meter is configured to:
        monitor client usage of the network-based service; and
        send to the auditor information reflecting the usage of the network-based service by the client usage simulator.

6. The system of claim 5, further comprising one or more computers implementing an auditor configured to:
- compare said information from the client usage simulator reflecting the usage of the network-based service to information from the service meter reflecting the usage of the network-based service by the client usage simulator; and
- indicate a discrepancy from the compare.

7. The system of claim 6, wherein the auditor is further configured to indicate said discrepancy in response to a result of said compare being outside a predetermined threshold.

8. The system of claim 5, wherein to monitor, by said service meter, client usage of the network-based service further comprises monitoring at least one of a bandwidth usage, virtual private network (VPN) usage, number of transactions, connection time, compute resource usage, or storage resource usage.

9. The system of claim 5, wherein the auditor is configured to, in response to detecting the discrepancy, compare usage records for other clients during a time period of the discrepancy to historical usage records to determine a source of the discrepancy.

10. A method, comprising:
- performing, by one or more computers implementing a client usage simulator:
  - simulating client usage external to a network-based service system, wherein simulating client usage comprises simulating one or more external clients utilizing a network-based service in the network-based service system; and
  - sending to an auditor information reflecting usage of the network-based service from the client usage simulation; and
- performing by one or more computers implementing a service meter internal to a network-based services system:
  - monitoring client usage of the network-based service; and
  - sending to an auditor information reflecting the usage of the network-based service.

11. The method of claim 10, further comprising:
- comparing said information reflecting the usage of the network-based service from the client usage simulation to information reflecting the usage of the network-based service; and
- in response to said comparing:
  - indicating a discrepancy from comparing said information reflecting the usage of the network-based service from the client usage simulation to information reflecting the usage of the network-based service.

12. The method of claim 10, wherein monitoring client usage of the network-based service further comprises monitoring at least one of a bandwidth usage, virtual private network (VPN) usage, number of transactions, connection time, compute resource usage or storage resource usage by said service meter.

13. The method of claim 10, further comprising:
- performing by one or more computers implementing a service meter internal to a network-based service system:
  - sending to a billing generator information reflecting the usage of the network-based services; and
  - converting the information to billing records.

14. The method of claim 11, wherein indicating a discrepancy from comparing said information reflecting the usage of the network-based service from the client usage simulation to information reflecting the usage of the network-based service further comprises comparing the results to a predetermined threshold.

15. A non-transitory, computer-readable storage medium storing program instructions that when executed by one or more computers implement an auditor configured to:
- receive information reflecting external client simulator usage of network-based services in a network-based service system from a usage simulator meter for the simulated external usage of the network-based services system;
- receive, from a service meter internal to the network-based services system, information reflecting usage of network-based services by the client usage simulator;
- compare said information from the usage simulator meter to the information from said service meter; and
- indicate a discrepancy from comparing said information from the usage simulator meter to the information from said service meter.

16. The non-transitory, computer-readable storage medium of claim 15, wherein in said information reflecting external client simulator usage further comprises at least one of a bandwidth usage, networking tunneling technology usage, number of transactions, connection time, computer resource usage or storage resource usage.

17. The non-transitory, computer-readable storage medium of claim 15, wherein the auditor is further configured to normalize, prior to said compare, the information reflecting external client simulator usage or the information from said service meter.

18. The non-transitory, computer-readable storage medium of claim 17, wherein to normalize the information reflecting external client simulator usage or the information from said service meter, the auditor is configured to adjust for a synchronization difference between the information reflecting external client simulator usage and the information from said service meter.

19. The non-transitory, computer-readable storage medium of claim 17, wherein to normalize the information reflecting external client simulator usage or the information from said service meter, the auditor is configured to adjust for a data capture methodology difference between the information reflecting external client simulator usage and the information from said service meter.

20. The non-transitory, computer-readable storage medium of claim 15, wherein in response to the discrepancy, the auditor is configured to compare usage records for other clients during a time period of the discrepancy to historical usage records to determine a source of the discrepancy.

21. The non-transitory, computer-readable storage medium of claim 20, wherein the auditor is further configured to:
- determine whether the usage records for other clients during the time period of the discrepancy are within historical norms according to usage patterns from the historical usage records; and
- in response to determining that the usage records for other clients are not within historical norms, indicate a potential problem with the service meter internal to the network-based services system.

22. The non-transitory, computer-readable storage medium of claim 20, wherein the auditor is further configured to:
- determine whether the usage records for other clients during the time period of the discrepancy are within historical norms according to usage patterns from the historical usage records; and in response to determining that the usage records for other clients are within historical norms, indicate a potential problem with the usage simulator meter external to the network-based services system.

* * * * *